United States Patent [19]

Taupin et al.

[11] Patent Number: 4,860,106
[45] Date of Patent: Aug. 22, 1989

[54] CIRCUIT FOR SWITCHING VIDEO SOURCES

[75] Inventors: Dominique Taupin, Paris; Philippe Vilard, Rueil, both of France

[73] Assignee: U.S. Philips Corporation, New York, N.Y.

[21] Appl. No.: 233,974

[22] Filed: Aug. 18, 1988

Related U.S. Application Data

[63] Continuation of Ser. No. 799,213, Nov. 18, 1985, abandoned.

[30] Foreign Application Priority Data

Nov. 20, 1984 [FR] France .................................. 84 17670

[51] Int. Cl.⁴ ........................................... H04N 5/268
[52] U.S. Cl. ........................................ 358/181; 358/22
[58] Field of Search ................. 358/181, 183, 22, 140, 358/146, 147, 160, 188

[56] References Cited

U.S. PATENT DOCUMENTS

| | | | |
|---|---|---|---|
| 3,120,652 | 2/1964 | Weighton et al. | 358/181 |
| 3,499,982 | 3/1970 | O'Neal, Jr. | 358/188 |
| 3,793,478 | 2/1974 | Verhoeven | 358/140 |
| 4,435,728 | 3/1984 | Raven et al. | 358/140 |
| 4,479,150 | 10/1984 | Ilmer et al. | 358/147 |
| 4,521,803 | 6/1985 | Gittinger | 358/12 |
| 4,580,163 | 4/1986 | Hartmeier | 358/140 |

FOREIGN PATENT DOCUMENTS

| | | | |
|---|---|---|---|
| 0130730 | 1/1985 | European Pat. Off. | 358/181 |
| 0177987 | 4/1986 | European Pat. Off. | 358/140 |
| 0022884 | 2/1985 | Japan | 358/181 |
| 0041377 | 3/1985 | Japan | 358/181 |
| 0075178 | 4/1985 | Japan | 358/181 |
| 1533238 | 11/1978 | United Kingdom | 358/181 |

*Primary Examiner*—Tommy P. Chin
*Attorney, Agent, or Firm*—Edward W. Goodman

[57] ABSTRACT

A circuit for "fast" switching in television system when there are more than two video sources (1, 2, 3) to be switched simplifies the realization of the change-over switches (5, 6) by replacing one or a plurality of fast change-over switches by a slow change-over switch (6), which is possible if the control signal (7) of the slow change-over switch (6) is maintained during at least one field with the aid of a timing circuit (9).

9 Claims, 2 Drawing Sheets

CIRCUIT FOR SWITCHING VIDEO SOURCES

This is a continuation division of application Ser. No. 799,213, Nov. 18, 1985, now abandoned.

BACKGROUND OF THE INVENTION

The invention relates to a circuit for rapidly switching, in a television receiver, at least three video sources which are connectable to a video processing stage providing the display of a picture, comprising at least two cascaded change-over switches, the first of which is connected directly to the video processing stage and the second is connected to the first, and whose switching action is controlled by means of a plurality of control signals.

The circuit according to the invention has for its object to select sources for forming a video picture on the screen of a television receiver. In addition to the internal main source which forms the demodulation stage output of the television receiver itself, it is possible to connect to the latter second auxiliary source constituted by external peripheral apparatus, more specifically a magnetoscope of which a special socket for the connection of peripheral apparatus, the so-called peritelevision socket is provided whose terminals can be connected to the video processing stage of the television set via change-over switches.

A circuit providing the necessary switching actions is described in European Patent Application No. 0 046 108. This circuit utilizes more specifically, for the control of the change-over switches a control signal applied to a terminal of the peritelevision socket. In the absence of this signal, if no special "audiovisual" button is pushed, the inverters are in the position in which they select the internal source.

There may be one or a plurality of third sources. Processes of transmitting magazine pages, for example the method known as Antiope, form a third video source. Similarly, numerical encoding methods make it possible to transmit, for example, sub-titles.

This third source is generally constituted by a decoder which forms an internal auxiliary source of the television receiver, which source can be selected independently of the other two sources. Consequently a change-over switch capable of switching in three directions is required.

Two sources can be used simultaneously to produce an inset, that is to say the alphanumerical characters coming from a source are inserted in an image coming from another source. To that end, at appropriate instants, the main picture is interrupted during the line scan to be replaced by any character element to be displayed, and the picture thereafter continues in the normal way until the subsequent character.

This requires very fast switching circuits, as, for example, a character element whose width is one hundredth of the overall width of a picture has a duration of not more than approximately 0.5 microseconds.

Fast-acting electronic switches are then necessary.

Such a fast three-way electronic change-over switch can be realized with the aid of a cascade arrangement of two fast two-way change-over switches. A black level aligning circuit is associated with each way of these change-over switches to ensure that the black level of the several sources are identical.

This switch assembly is comparatively complicated and costly.

SUMMARY OF THE INVENTION

The invention has for its object to simplify the realization of a part of the change-over switches and to lower the price correspondingly. It is based on the notion that the external source (peritelevision socket) and the internal auxiliary source are not used together, and that when two interruptors are arranged in series, the faster of the two can define the switching rate of the assembly provided the slower switch is closed before and opened after the first. Thus, the invention proposes the use of a fast change-over switch which is used in common by all the sources, and to make a selection among the auxiliary sources with the aid of a slow change-over switch, which is less expensive than a fast change-over switch. It is then necessary to control this slow change-over switch in a special manner: the circuit according to the invention is therefore characterized in that the change-over switch not directly connected to the video processing stage is of a slow-switching type, and that the change-over switch control signal path includes a timing circuit which preserves said signal during at least one field period.

Advantageously, the timing circuit comprises a resistance-capacitance analog circuit which allows a simple structure when discrete components are used.

With standard integrated circuits or for a completely integrated structure, the timing circuit comprises advantageously a logic circuit which operates from field pulses and from the control signal intended for the slow change-over switch and preserves and control signal during at least one field period.

BRIEF DESCRIPTION OF THE DRAWINGS

The following description, which is given by way of non-limitative example with reference to the accompanying drawings will make it better understood how the invention can be put into effect.

DETAILED DESCRIPTION OF THE INVENTION

Figure 1:
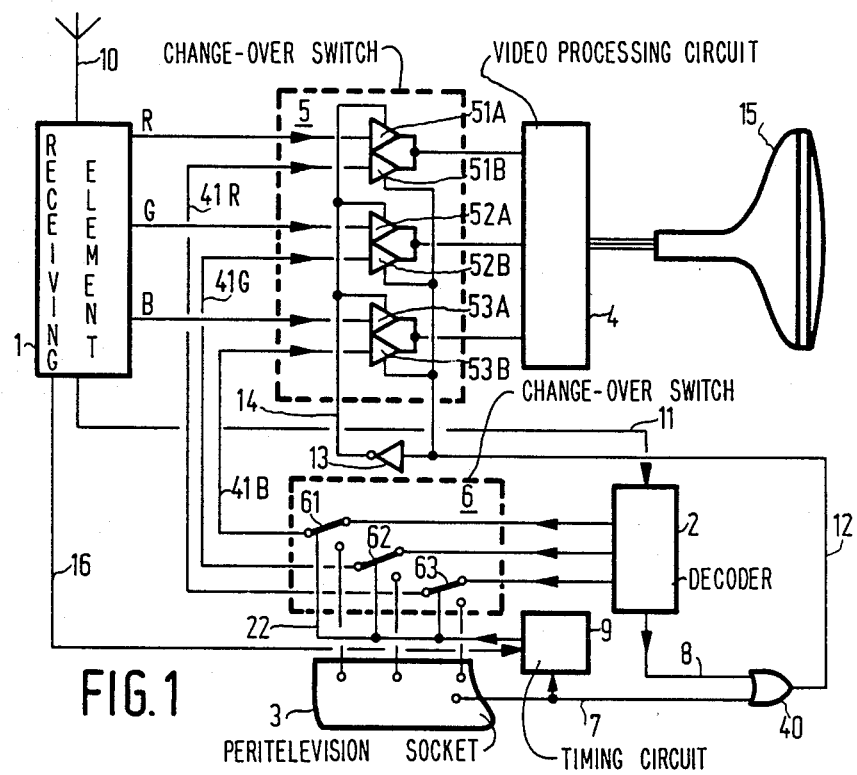
FIG. 1 shows part of a circuit diagram of a television receiver in which the circuit according to the invention is represented.

In FIG. 1 an aerial 10 is connected to the receiving element 1 which constitutes a first source (main, internal) and produces three color components red, green. blue (R, G, B) of a picture.

Second sources (auxiliary, external, not shown) such as: magnetoscopes, video games, video disc reader etc. can be connected by means of a peritelevision socket 3. A decoder 2 which via the conductor 11 receives encoded signals taken from the aerial signal, coming from the receiving element 1 constitutes a third picture source (auxiliary, internal). This decoder is, for example, an "Antiope" or "Teletext" decoder.

The pictures coming from these three sources can be applied to a video processing stage 4, which initiates the display of a picture on the screen of a cathode tube 15.

To ensure the routing and selection of the pictures, the circuit comprises two cascaded change-over switches. A first change-over switch 5 connected directly to the input of the video processing stage 4 selects between two sources: either the internal main source 1 or any of the other sources provides the information to be displayed. This fast change-over switch which allows the inset in the picture, is realized with fast analog gates 51A, 51B for the red channel, 52A, 52B for the green channel and 53A, 53B for the blue channel, forming a two-channel three-fold change-over switch. One single gate per color is open, for example the gate referenced A for selecting the main source 1, while the other one is closed, for example the gate denoted by B in the example given. This effect is obtained because the gates denoted by B are controlled together by a signal applied via the connection 12, while an inverter 13 produces the inverted signal, which is applied via the connection 14 to the gates denoted by A. Each conductor R, G, B in each channel is connected to a well-known black level aligning circuit not shown for the sake of clarity of the picture. In practice this assembly of change-over switches and the adjoining circuits are usually included in the integrated color decoding circuits such as, for example, circuit TDA 3560 marketed by Messrs. PHILIPS. In the English specification of this circuit, the blocks comprising said change-over switches are designated by the words "DATA INSERTION".

A second three-fold change-over switch 6 is connected to the first switch via a three-wire connection 41R, 41G, 41B. The switching action is controlled by a signal applied via the connection 22. This change-over switch enables the choice between the picture supplied by the external source via the socket 3 and the picture supplied by the decoder 2. Although this change-over switch is symbolically represented by the switching arms 61, 62, 63 switching between contacts, the switch 6 is an electronic change-over switch.

This additional change-over switch is advantageously of a slow-switching type, that is to say it can be chosen from low-priced circuits which consume only little power, such as MOS circuits. The circuit marketed under type number HEF 4053 by Messes. PHILIPS which is a two-channel three-fold change-over switch, is suitable for constituting the change-over switch 6, although its switching time is a priori too long to allow the inset of fine characters. Insetting fine characters is rendered possible be providing, in the control signal path of this switch 6, a timing circuit 9 which maintains said signal during at least one field period.

When a picture coming from a source must be applied, a control signal appears at least once in each field during a large number of consecutive fields, so as to ensure a display time which is sufficiently long to be perceived by the human eye. If this signal is maintained during at least one field, that is to say until it appears again in the subsequent field, the resultant signal becomes continuous in as far as a picture must be displayed and the slow-acting switch is energized once only during the display period: consequently it has ample time to arrive in the required position. Even if it should take several field periods before it has assumed its position, this will not be annoying as the information is repeated; the only requirements as regards speed is that the required position must be reached in a period of time not perceptible to the eye.

The auxiliary sources only transmit a signal when they have a picture to be displayed: if absolutely no signal is present, the internal main source is selected.

The control signal coming from the auxiliary socket 3 is applied via a connection 7; the control signal coming from the decoder 2 is applied via a connection 8. These two connections 7, 8 are let to an OR-gate 40 whose output is connected via the connection 12 to the change-over switch 5. If at least one of the sources 3 or 2 is active a high signal on the connection 12 opens the gates 51B, 52B, 53B, and the picture signal coming from the change-over switch 6 via the connections 41 is applied to the video processing circuit 4. When none of the sources 2 or 3 is active, the signal on the connection 2 is in the low state, the gates 51A, 52A, 53A are opened and the picture signal from the main source 1 is applied to the circuit 4.

Figure 2:
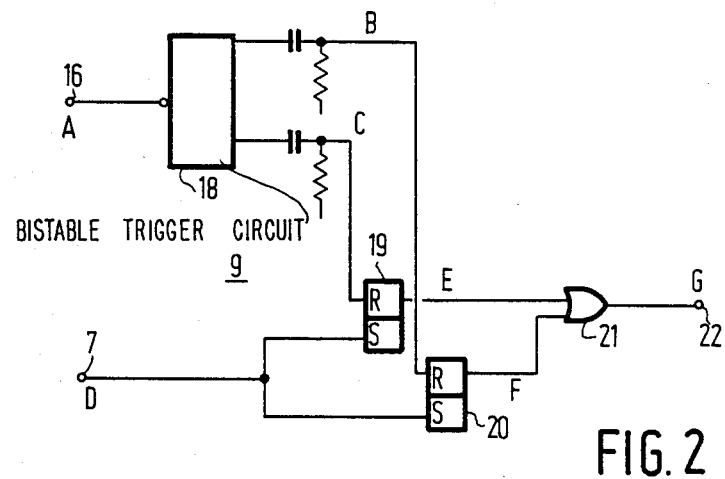
FIG. 2 shows an embodiment of block 9 of FIG. 1.

FIG. 2 shows a timing circuit 9, constituted by a logic circuit which maintains the corresponding control signal, the signal from the connection 7, during at least one field period. This circuit proceeds from the field pulses applied to a terminal 16 of the socket 3 shown in FIG. 2 and the control signal at the terminal seven of the socket 3 which is connected to the connection 7 such that when a brief control signal has been detected at the terminal seven at least once during a field, it is maintained on the output connection 22 just till the end of the subsequent field.

The signals in this assembly are shown in the FIGS. 4A to G. The signal A is the field signal present on the terminal 16 of the socket 3. Each of these pulses causes a bistable trigger circuit 18 (Eccles Jordan or master-slave) to change state, whose two outputs are thus each alternately in the high state during one field and thereafter in the low state during the subsequent field.

Figure 4:
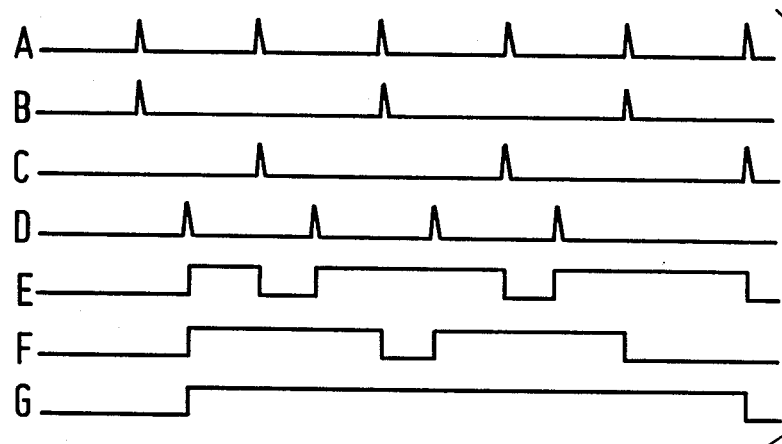
FIG. 4 is a diagram of signals obtained in the circuit diagram of FIG. 2.

The signals from these outputs are differentiated in a capacitance-resistance circuit and in B and C one pulse is found for two field retraces, alternately in B and C (FIG. 4B and C). These pulses B and C are applied to respective inputs of a bistable trigger circuit RS20 and a bistable trigger circuit RS19, the other input of each of these bistable trigger circuits being connected to the terminal 7 to which the control signal shown in 4D is applied. This signal is here available during four fields to illustrate the mode of operation. In practice it will be available during much more than four fields. At the first appearance of the signal, the outputs E, F of the bistable trigger circuits 19 and 20 change to the high state. At the appearance of a pulse C, the bistable trigger circuit 19 returns to zero (signal E). It increases to 1 in response to the subsequent control signal D. The next field signal causes the bistable trigger circuit 20 to return to zero value (signal F), and it increases in response to the subsequent signal D. When the signal D does not come forward anymore the bistable trigger circuit 20 (signal F) returns to zero for the subsequent signal B and the bistable trigger circuit 19 (signal E) for the subsequent signal C. There-after they permanently remain at zero as long as no signal D appears. The outputs of the two bistable trigger circuits 19 and 20 are added together in an OR-circuit 21 to form the output signal G on terminal 22. This output signal changes to the high state in response to the first signal D and is maintained during at least one field period after the last signal D.

Figure 3:
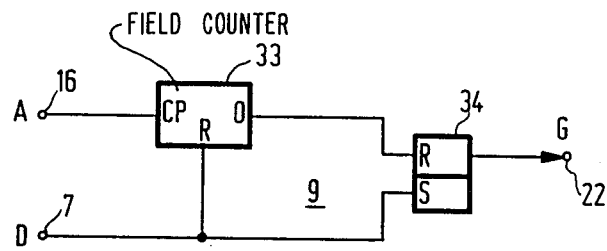
FIG. 3 shows a second embodiment of that block 9.

It is obviously possible to conceive other logic circuit arrangements producing the same result. By way of additional example, FIG. 3 illustrates one of these possibilities: the field signal is applied to the terminal 16 and energizes the output CP of a counter 33 which consequently counts the fields. The counter can count at least to two and when it has reached its maximum count, in this example two, a signal appears at its output 0 having significance two, which output is connected to an input of a bistable flip-flop R-S 34 for resetting it to zero. The control signal D on the connection of 7 is applied to the reset-to-zero terminal R of the counter 33, and to the other input of the bistable trigger circuit F-S 34 for resetting it to the high state. If no signal D is applied, the bistable trigger circuit is reset to zero at the end of two fields, and thereafter remains at zero. From the moment a signal D is applied, this bistable trigger circuit changes to the high state and the counter is reset to zero. As long as a signal D is present at least once per field, the counter is reset to zero for each field. When the signal D is not applied anymore, the counter counts two fields and thereafter resets the bistable trigger circuit 34 to zero, so the same effect is obtained as with the assembly shown in FIG. 2.

Figure 5:
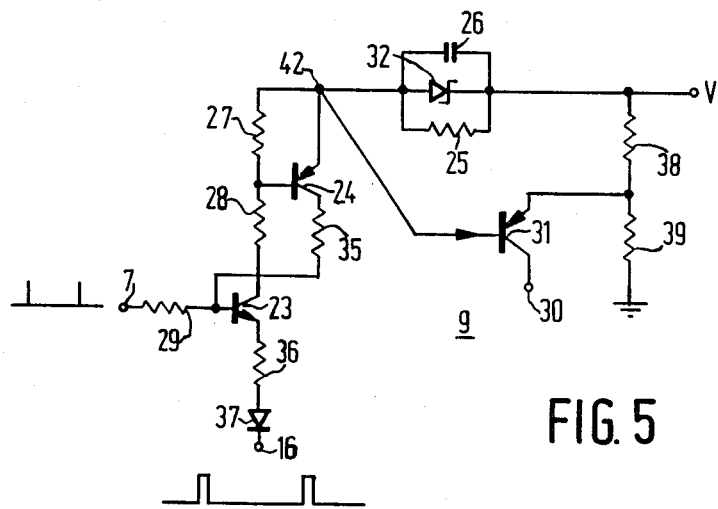
FIG. 5 shows a third embodiment of block 9.

Timing can alternatively be obtained using an analog circuit, for example, a circuit based on a well-known monostable circuit energized by the control pulse. A particularly suitable circuit of such a type is shown in FIG. 5. This timing circuit 9 comprises a resistance-capacitance analog circuit 25, 26 with time constants. It includes furthermore an avalanche semiconductor assembly, here formed by two complementary transistors 23, 24 one of which has its collector connected via a resistor to the base of the other transistor and the other way round. The positive control signal on the connection 7 is applied to the base of the NPN transistor 23 and renders it conductive, which causes the PNP transistor 24 to become also conductive and thereafter the assembly remains in the conductive state until a positive field signal at the terminal 16 connected to the emitter of the transistor 23 cuts-off the latter and consequently also the associated transistor 24. The assembly is arranged in series with a circuit 25, 26 having a time constant, which time constant is equal to or longer than one field period. The junction 42 of the emitter of the transistor 24 with said time-constant circuit is connected to the base of a transistor 31, whose emitter is connected to a divider bridge 38, 39 supplying an intermediate voltage between the supply voltage V and the voltage at the junction 42 when the avalanche assembly is in the conductive state. This latter voltage is fixed by a zener diode 32 arranged in parallel with the resistance 25-capacitance 26 circuit. When a current flows through this assembly, the transistor 31 is then in the conductive state and its collector current available on terminal 30 controls the change-over switch 6. Time constant of the circuit must here be understood to mean the time necessary, when the transistors 23, 24 are cut off, for the voltage at junction 42 to increase sufficiently high to bring about blocking of the transistor 31. This time must be longer than or equal to one field period.

A resistor 27 is connected between the emitter and the base of the transistor 24 to increase the collector current of the transistor 23. The series-arranged resistors 29 and 36 in the current path of the base of the transistor 23 function as current limiters. The diode 37 arranged in series with the emitter of the transistor 23 prevents the current from changing direction, when the field pulse at the terminal 16 becomes very positive.

The circuit operates satisfactorily when the several components have the following values:

| T23 | BC548 | R29 | 2,2K |
|-----|-------|-----|------|
| T24 | BC558 | T31 | BC558 |
| R25 | 22K | R35 | 3,3K |
| C26 | 2,2 μF | R36 | 3,3K |
|  |  | D37 | 1N 4140 |
| R27 | 4,7K | R38 | 3,3K |
| R28 | 33K | R39 | 33K |

The time constant can be adjusted very easily by acting on the threshold voltage of the transistor 31 by modifying, for example, the resistor 39 whose value is only given by way of example. It should be noted that the timing period is not critical, provided it has an adequate length. In the case shown in FIG. 3, the timing period duration can alternatively be obtained by counting a frequency other than the field frequency on the condition that the capacity of the counter is changed.

As regards the general mode of operation of the system, it should be noted that when, for example, a picture coming from the socket 3 must be inset in the main picture, the image signals coming from the socket 3 are permanently selected by the change-over switch 6 because of the timing circuit 9, but a brief signal controlling the insetting operation reaches nevertheless without a delay the fast commutator 5 through the connection 7 via the gate 40, and this fast commutator 5 realizes the inset. The system described in the foregoing relates to the so-called fast switching operation. For that reason no sound switching is considered, as this sound switching operation is not affected by the fast switching operation. These two different types of switching cause namely distinct problems, such that the "slow" switching signal which also acts on the sound appears at pin light (not shown) of the peritelevision socket 3 while the "fast" switching signal used here appears at pin sixteen. These numerals eight and sixteen relate to the standardized socket and not to the accompanying drawing of this description.

The above assembly can usually be modified for use with more than two auxiliary sources to be switched. TO choose, for example, from among four sources in addition to the main source, that is to say two sources more than in the example described in the foregoing, it is possible to use for the change-over switch 6 circuits of the type HEF 4052 which are dual four-channel change-over switches. Since here are three color channels, one and a half circuit must be used, as each circuit comprises only one dual change-over switch. The gate 40 of FIG. 1 must then have four inputs, as there are four separate control signals, and three of these signals must each flow through a timing circuit. When the circuit of FIG. 3 is taken as an example the field counter 33 may be used in common, its reset-to-zero input then being reached via an OR-gate, the input of which would be connected to one of the said three control signals. Three bistable trigger circuits R-S 34 are then present, each having its S input connected to a control signal and all the R inputs of these bistable trigger circuits would be connected together to the output 0 of the counter 33. The high-state output of one of the three bistable trigger circuits R-S then indicates that the corresponding channel must be selected by the four-channel change-over switch 5, the fourth channel being chosen when the three bistable trigger circuits are all in the low state. It is easy to provide furthermore for the three relevant sources a logic priority system which improves the operation of the arrangement, for the case in which a plurality of sources must be simultaneously energized.

We claim:

1. A circuit for rapidly switching, in a television receiver, between at least three separate video sources which are connectable to a video processing stage providing the display of a picture, said circuit comprising at least a first change-over switch in cascade with a second change-over switch, the first change-over switch having an output coupled directly to the video processing stage, a first input coupled to one of said at least three separate video sources, and a second input; and the second change-over switch having an output coupled to the second input of said first change-over switch and inputs coupled, respectively to the others of said at least three separate video sources the switching action of said circuit being controlled by a plurality of control signals emitted by a control signal means coupled to said second change-over switch, characterized in that said first change-over switch has a switching speed substantially faster than that of said second change-over switch and that the control signal means includes a timing circuit which preserves said control signals during at least one field period, wherein the switching speed of said first change-over switch establishes the switching speed of said rapidly switching circuit.

2. A circuit as claimed in claim 1, wherein the timing circuit comprises a logic circuit which preserves a said control signals during at least one field period.

3. A circuit as claimed in claim 3, wherein the logic circuit operates in response to field pulses and said control signals such that when said control signals have a short duration and occurs at least once in every field period said control signals are maintained by said logic circuit up to the end of a subsequent field period 4. A circuit as claimed in claim 3, wherein the logic circuit comprises a divide-by-two divider for dividing a field frequency which produces a field signal alternately on a first output and on a second output and in that these two outputs are each coupled to an input of a respective bistable trigger circuit R-S whose other input receives said control signals, the outputs of these bistable trigger circuits R-S being each coupled to a respective input of a logic gate whose output applies said preserved control signals to the second change-over switch.

5. A circuit as claimed in claim 3, wherein the logic circuit comprises a field pulse counter, having a maximum count of at least two, which is reset to zero by said control signals and a bistable trigger circuit R-S having one input coupled to an output of said field pulse counter and a second input energized by said control signals.

6. A circuit for rapidly switching, between a main source and one of a plurality of auxiliary sources of video which are connectable to a video processing stage providing the display of a television picture, said circuit comprising:
a first change-over switch having first and second inputs, said first input coupled to said main source, and an output coupled to said video processing stage, said first change-over switch having a first switching rate for alternately switching said first and second inputs to said output;
a second change-over switch having an output coupled to said second input of said first change-over switch and a plurality of inputs each coupled to ones of said plurality of auxiliary sources for selectable connecting one of said auxiliary sources to said first change-over switch, said second change-over switch having a second switching rate for alternately switching said plurality of inputs to said output; and
a control signal means coupled to said second change-over switch for providing a plurality of control signals to said second change-over switch, said control signal means comprising a means for storing said control signals during at least one field period, wherein said first switching rate is substantially faster than said second switching rate and said first switching rate establishes the switching speed of said rapidly switching circuit..

7. A circuit as claimed in claim 6, wherein a connection to the video processing stage is effected via three-wire links "red, green, blue" and that said first and second change-over switches are three-fold switches.

8. A circuit as claimed in claim 7, wherein said control signal means comprises an avalanche semiconductor assembly which is rendered conductive by the control signal and is cut-off by a field signal, arranged in series with a time-constant circuit having a resistance-capacitance time constant which is equal to or longer than said one field period.

9. A circuit as claimed in claim 6, wherein said control signal means comprises an analog circuit having resistance-capacitance time constants.

* * * * *